United States Patent
Sasaki et al.

(10) Patent No.: US 9,054,623 B2
(45) Date of Patent: Jun. 9, 2015

(54) MOTOR CONTROL DEVICE

(75) Inventors: Ryuta Sasaki, Osaka (JP); Kenichi Kishimoto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/236,129

(22) PCT Filed: Jul. 25, 2012

(86) PCT No.: PCT/JP2012/004727
§ 371 (c)(1),
(2), (4) Date: Jan. 30, 2014

(87) PCT Pub. No.: WO2013/021562
PCT Pub. Date: Feb. 14, 2013

(65) Prior Publication Data
US 2014/0152207 A1    Jun. 5, 2014

(30) Foreign Application Priority Data

Aug. 10, 2011    (JP) .................................. 2011-174719

(51) Int. Cl.
*H02P 21/00* (2006.01)
*H02P 21/14* (2006.01)
(52) U.S. Cl.
CPC ............ *H02P 21/0035* (2013.01); *H02P 21/14* (2013.01); *H02P 21/0089* (2013.01); *H02P 2207/05* (2013.01)
(58) Field of Classification Search
CPC .. H02P 21/0089; H02P 21/0003; H02P 21/14

USPC ...................................................... 318/400.02
See application file for complete search history.

(56) References Cited

FOREIGN PATENT DOCUMENTS

| JP | 11-027996 A | 1/1999 |
|---|---|---|
| JP | 2003-209996 A | 7/2003 |
| JP | 2006-141095 A | 6/2006 |
| JP | 2006-254572 A | 9/2006 |
| JP | 2010-057223 A | 3/2010 |

OTHER PUBLICATIONS

International Search Report for Application No. PCT/JP2012/004727, dated Oct. 30, 2012.

*Primary Examiner* — Erick Glass
(74) *Attorney, Agent, or Firm* — RatnerPrestia

(57) ABSTRACT

A motor control device according to the present invention includes a motor driving unit for driving a motor, a current vector controller, a magnetic-flux weakening current command generator, and one of a target command limiter and a q-axis current command limiter. The current vector controller controls a current of the motor by separating the current into a d-axis current and a q-axis current orthogonal to each other, in accordance with a target command value from the outside. The magnetic-flux weakening current command generator generates a d-axis current command to control the amount of the d-axis current, based on one of differences, i.e. a difference between a first predetermined reference value and the absolute value of a voltage command from the current vector controller to the motor driving unit and a difference between a second predetermined reference value and a q-axis component of the voltage command. The target command limiter sets a limit value of the target command value from the outside, based on an excessive amount of the d-axis current command over a negative upper limit.

5 Claims, 12 Drawing Sheets

… (1)

MOTOR CONTROL DEVICE

This Application is a U.S. National Phase Application of PCT International Application PCT/JP2012/004727.

TECHNICAL FIELD

The present invention relates to technologies, employed in motor control devices using current vector control, for use in power running operation or regeneration operation of motors in around their voltage saturation regions by performing a magnetic-flux weakening control and command limiting.

BACKGROUND ART

As a method for controlling electric current of a motor, a vector control is commonly used in which the current of the motor is controlled by separating the current into a q-axis current component contributing to torque and a d-axis current component orthogonal to the q-axis one. A vector controller computes, upon receiving an external command, a command voltage for a motor driving unit which supplies electric power to the motor.

There is a phenomenon that the command voltage exceeds a suppliable voltage of the motor driving unit in the case such as where the external command becomes too large. This phenomenon is called voltage saturation. The higher the rotating speed of the motor, the more the voltage saturation tends to occur. This is because an induced voltage occurring during motor rotation increases in proportion to the rotating speed, resulting in an increase in the terminal voltage as well of the motor to compensate for the increase in the induced voltage with supply voltage. Moreover, in the case of such as a large load and a low power supply voltage, the voltage saturation becomes more easily to occur because a margin of the supply voltage becomes small.

In a state of the voltage saturation, the q-axis current becomes unable to be increased during power running operation, which results in a drop in torque and/or in saturation (wind-up) of integration terms in a current controller, leading to deteriorated static and dynamic characteristics. In addition, during regeneration operation, a large amount of the q-axis current flows that exceeds a command value, which causes an overcurrent, an overvoltage, and an excessive braking torque, leading to deteriorated safety.

As a means of suppressing the voltage saturation, a magnetic-flux weakening control is adopted in which a negative d-axis current is passed to reduce the magnetic flux of a permanent magnet in order to suppress the increase in the induced voltage.

As an example of the conventional magnetic-flux weakening control, a closed-loop magnetic-flux weakening control is adopted in which a means of detecting the voltage saturation is disposed (see Patent Literature 1, for example). This control includes the steps of integrating a signal or an appropriate fixed value which corresponds to the saturation detected with the means of detection, and outputting the thus-integrated value as a d-axis current command to the current controller.

However, if the negative d-axis current continues to be increased, the effect of reducing the voltage will decrease to be low and the voltage turns from decreasing to increasing, after a while. The turning point for the voltage to increase is a critical point of the magnetic-flux weakening control described above. At the critical point, a margin of the motor terminal voltage reaches the maximum value. That is, this brings about the state where the flowable q-axis current and the outputtable torque reach their maximum values (the maximum torque that the motor can output is sometimes referred to as the limit torque, hereinafter).

The limit torque is not constant, but varies in accordance with the state of the motor. Because a margin of the motor terminal voltage becomes small with increasing induced voltage, the limit torque decreases with increasing rotation number. For this reason, there are cases where the torque outputtable in a low speed region cannot be output in a high speed region even under the magnetic-flux weakening control.

When torque larger than the limit torque is tried to output, this leads to the state of the voltage saturation which causes a torque follow-up error and wind-up, resulting in an unstable control and deteriorated characteristics. Moreover, when the closed-loop magnetic-flux weakening control described above is adopted in the state of the voltage saturation, the d-axis current command diverges toward the negative direction, resulting in an unstable control.

Patent Literature 2 is an example of conventional technologies for addressing the output limit. FIG. 14 is a block diagram of a controller of a motor according to the conventional technology described in Patent Literature 2. The controller is equipped with current vector controller 103, saturation detector 904, saturation integrator 905, d-axis current upper-limit computing unit 108, d-axis current command limiter 109, target command limit computing unit 914, and target command limiter 110. Current vector controller 103 controls the current of motor 101 in accordance with torque command $\tau_0{}^*$ from the outside. Saturation detector 904 detects the presence or absence of the voltage saturation based on voltage commands vd* and vq* from current vector controller 103 to motor driving unit 102. Saturation integrator 905 performs an integration operation based on a saturation detection signal output from saturation detector 904 so as to generate magnetic-flux weakening current command $ids_0{}^*$ that serves as a negative d-axis current command. D-axis current upper-limit computing unit 108 and d-axis current command limiter 109 provide a setting of negative upper limit $ids_{lmt}$ of the magnetic-flux weakening current command, based on both suppliable voltage Vc of motor driving unit 102 and rotating speed ω of motor 101. Target command limit computing unit 914 provides a setting of limit torque $\tau_{lmt}{}^*$ based on Vc, ω, and $ids_{lmt}$ described above.

The configuration described above allows the magnetic-flux weakening control to suppress the voltage saturation and causes external torque command $\tau_0{}^*$ to be limited to limit torque $\tau_{lmt}{}^*$ outputtable from the motor, which results in the elimination of the voltage saturation over the entire operation region. In addition, the control allows magnetic-flux weakening current command ids* to be limited to upper limit $ids_{lmt}$ of the magnetic-flux weakening current command for obtaining limit torque $\tau_{lmt}{}^*$, which prevents the d-axis current command from diverging.

However, in the method according to Patent Literature 2, limit torque $\tau_{lmt}{}^*$ outputtable from motor 101 is computed from voltage Vc suppliable from motor driving unit 102, rotating speed ω of motor 101, and negative upper limit $ids_{lmt}$ of the magnetic-flux weakening current command. The computation is performed using a computation expression which includes inherent constants of the motor, such as inductance. For this reason, limit torque $\tau_{lmt}{}^*$ cannot be correctly computed in the presence of variations of inductance attributed to the operation state of the motor and/or motor-to-motor unevenness in the motor constants.

When, limit torque $\tau_{lmt}{}^*$ is set larger than the actual limit torque due to the computation error, the current control is performed based on torque command τ* larger than the actual limit torque, so that the voltage saturation cannot sometimes be eliminated.

Conversely, when limit torque $\tau_{lmt}*$ is set smaller than the actual limit torque, torque command τ* is excessively limited, so that adequate torque cannot sometimes be obtained.

CITATION LIST

Patent Literatures

Patent Literature 1: Japanese Patent Unexamined Publication No. H11-27996
Patent Literature 2: Japanese Patent Unexamined Publication No. 2003-209996
Patent Literature 3: Japanese Patent Unexamined Publication No. 2006-254572

SUMMARY OF THE INVENTION

A motor control device according to the present invention includes a motor driving unit for driving a motor, a current vector controller, a magnetic-flux weakening current command generator, and one of a target command limiter and a q-axis current command limiter. The current vector controller controls electric current of the motor by separating the current into a d-axis current and a q-axis current orthogonal to each other, in accordance with a target command value from the outside. The magnetic-flux weakening current command generator generates a d-axis current command for controlling an amount of the d-axis current, based on one of the differences: That is, a difference between a first predetermined reference value and the absolute value of a voltage command from the current vector controller to the motor driving unit, and a difference between a second predetermined reference value and the q-axis component of the voltage command. The target command limiter sets a limit value of the target command value from the outside, based on a value by which the d-axis current command exceeds a negative upper limit. The q-axis current command limiter sets a limit value of a q-axis current command for controlling an amount of the q-axis current.

With this configuration, even when the target command value exceeding an outputtable limit of the motor is inputted, it is possible to hold the d-axis current command equal to an upper limit and possible to restrict, automatically and correctly, either the target command value or the q-axis current command to the outputtable limit. As a result, even with variations and/or motor-to-motor unevenness in motor constants, it is possible to eliminate the voltage saturation and to drive the motor, with the outputtable limit being maintained.

DESCRIPTION OF EMBODIMENTS

Hereinafter, embodiments of the present invention will be described with reference to the accompanying drawings. Note, however, that the embodiments should not be construed as limitations on the present invention.

First Exemplary Embodiment

Figure 1:
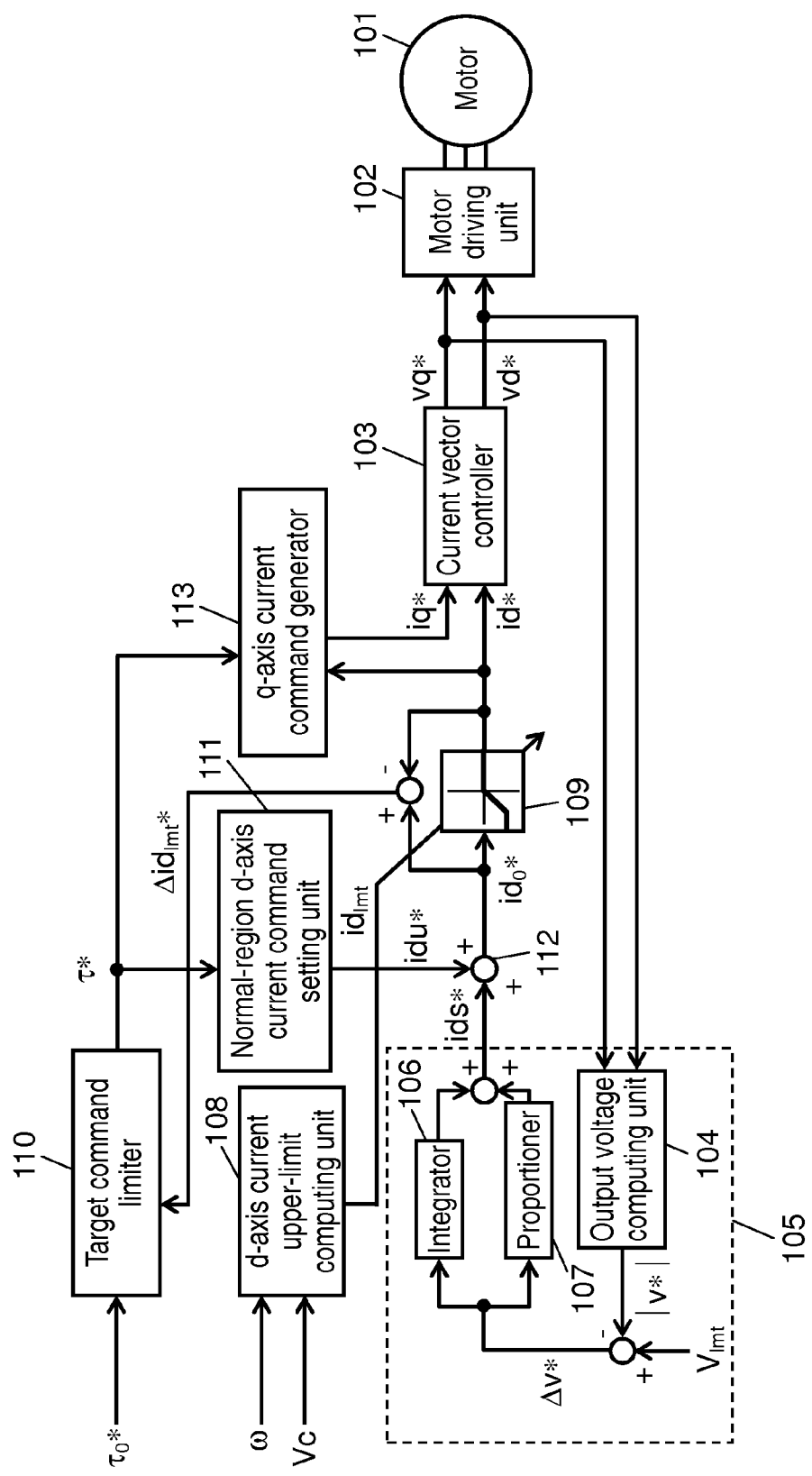
FIG. 1 is a block diagram of a motor control device according to a first embodiment of the present invention.

FIG. 1 is a block diagram of a motor control device according to a first embodiment of the present invention. FIG. 1 shows a drive control system of the device which drives permanent magnet type synchronous motor (sometimes referred to as "PMSM" or more simply as "motor," hereinafter) 101 in accordance with torque command $\tau_0*$ from the outside.

Hereinafter, descriptions will be made regarding operation of each of the parts. The motor control device according to the embodiment includes motor driving unit 102, current vector controller 103, magnetic-flux weakening current command generator 105, d-axis current upper-limit computing unit 108, d-axis current command limiter 109, target command limiter 110, normal-region d-axis current command setting unit 111, d-axis current command adder 112, and q-axis current command generator 113. Moreover, magnetic-flux weakening current command generator 105 is configured with output voltage computing unit 104, integrator 106, and proportioner 107.

Motor driving unit 102 performs a two-phase-to-three-phase conversion and a power conversion. In the two-phase-to-three-phase conversion, voltage commands vd* and vq* are converted into a three-phase voltage command which is supplied to U-phase, V-phase, and W-phase of the PMSM, where vd* and vq* are commands for the d-axis representing the field direction of the PMSM and the q-axis orthogonal to the d-axis, respectively. In the power conversion, an actual voltage is generated for each of the phases of the PMSM, in accordance with the three-phase voltage command.

Current vector controller 103 generates d-axis voltage command vd* such that an error becomes equal to zero between the value of the d-axis current and the value of d-axis current command id* that controls the amount of the d-axis current. Moreover, current vector controller 103 generates q-axis voltage command vq* such that an error becomes equal to zero between the value of the q-axis current and the value of q-axis current command iq* that controls the amount of the q-axis current. As a means for generating d-axis voltage command vd* and q-axis voltage command vq*, a PI control is used, for example.

Normal-region d-axis current command setting unit 111 generates d-axis current command idu* in the operation region where no voltage saturation occurs. The generation rule of the command is not limited to a specific one. For example, the rule includes a maximized torque-to-current ratio operation and a maximized efficiency operation. The command is used for adjusting the current phase such that a copper loss and an iron loss of the motor are reduced in the operation region where no voltage saturation occurs. Alternatively, the command may simply be generated such that idu*=0 (zero) is output to hold the d-axis current equal always to zero in the operation region without the voltage saturation.

Q-axis current command generator 113 generates q-axis current command iq* that causes the torque of the PMSM to follow torque command τ*. The generation rule employs Equation-1, for example, that expresses a relation between the output torque of the PMSM and the current. In Equation 1, Ld and Lq are respectively the d-axis and q-axis inductances, P is the number of pole pairs of the PMSM, $\Psi_0$ is the armature interlinkage flux caused by the permanent magnet, τ is the torque, and id and iq are respectively the d-axis and q-axis currents.

$$\tau = P\{\psi_0 \cdot iq + (Ld - Lq) \cdot id \cdot iq\} \quad \text{[Equation-1]}$$

In the embodiment, either Equation-1 or a data table based on the equation is installed in q-axis current command generator 113 such that q-axis current command iq* is generated based on torque command τ* and d-axis current command id*.

Output voltage computing unit 104 substitutes, into Equation-2, voltage commands vd* and vq* from current vector controller 103 to motor driving unit 102, and computes absolute value |v*| of the voltage command.

$$|v^*| = \sqrt{vd^{*2} + vq^{*2}} \quad \text{[Equation-2]}$$

Magnetic-flux weakening current command generator 105 generates d-axis current command component ids* (referred to as the magnetic-flux weakening current command, hereinafter) for use in the magnetic-flux weakening control, in the following manner. That is, voltage difference Δv* is computed by subtracting absolute value |v*| from first predetermined reference value $V_{lmt}$. Then, the command is obtained by adding the value yielded by integrating voltage difference Δv* using integrator 106 and the value yielded by proportionating voltage difference Δv* using proportioner 107.

Here, first predetermined reference value $V_{lmt}$ is set to the value equal to the maximum suppliable voltage of motor driving unit 102. With this setting, in the voltage saturation, negative voltage difference Δv* is inputted which causes magnetic-flux weakening current command ids* to rise in the negative direction. On the other hand, in the absence of the voltage saturation, positive voltage difference Δv* is inputted which causes magnetic-flux weakening current command ids* to rise in the positive direction. That is, magnetic-flux weakening current command ids* is generated in accordance with the degree of the voltage saturation.

Note, however, that first predetermined reference value $V_{lmt}$ may be set to a value smaller than the maximum suppliable voltage of motor driving unit 102. Moreover, because of no need for a positive d-axis current, the maximum value is set equal to zero by d-axis current command limiter 109 to be described later. In addition, the maximum integrated value is also restricted to zero by integrator 106 of magnetic-flux weakening current command generator 105.

D-axis current command adder 112 generates d-axis current command $Id_0^*$ by adding d-axis current command component idu* generated by normal-region d-axis current command setting unit 111 and magnetic-flux weakening current command ids* generated by magnetic-flux weakening current command generator 105.

Next, descriptions will be made regarding operations of d-axis current upper-limit computing unit 108, d-axis current command limiter 109, and target command limiter 110 that restricts the torque command. These parts work in conjunction with each other.

Figure 9:
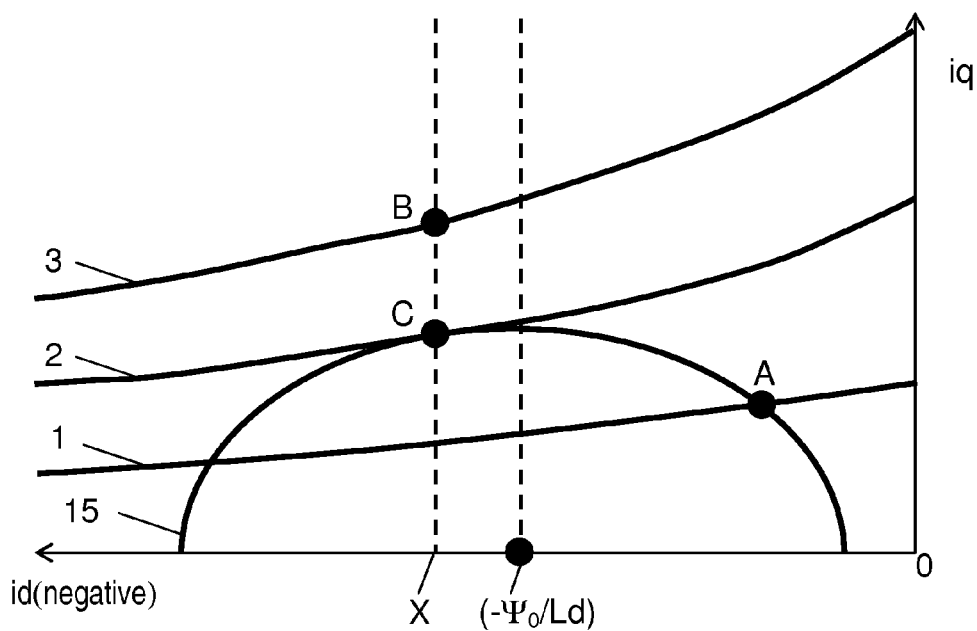
FIG. 9 is a view of a current vector locus in an interior permanent magnet type synchronous motor.

A view of a current vector locus in the PMSM is shown in FIG. 9 as a supplement to the descriptions. The current vector locus is obtained in such a manner as follows: That is, in a rectangle coordinate system made up of a d-axis representing the d-axis current and a q-axis representing the q-axis current, a sum current of the d-axis current and the q-axis current is represented as a current vector, the initial point of which is the coordinate origin. Then, the locus of the vector is plotted in the coordinate system. FIG. 9 is the view of the current vector locus specifically in an interior permanent magnet type synchronous motor (referred sometimes to as an "IPMSM," hereinafter).

Voltage limiting oval 15 in FIG. 9 indicates a selection area of the current vector that is restricted by the suppliable voltage of motor driving unit 102, while the outside of the oval indicates a voltage saturation region. Voltage limiting oval 15 becomes small with increasing rotating speed and/or decreasing power supply voltage.

In FIG. 9, each of constant torque curves 1, 2, and 3 based on Equation-1 indicates the current vector locus of the current to output a specified value of torque.

D-axis current upper-limit computing unit 108 computes negative upper limit $id_{lmt}$ of the d-axis current command, from both rotating speed ω of motor 101 and suppliable voltage Vc of motor driving unit 102. Although the definition of negative upper limit $id_{lmt}$ is not limited to a specific one, the negative upper limit is set equal, in this description, to the d-axis current that yields the limit torque outputtable from motor 101. The limit torque is represented by the constant torque curve (constant torque curve 2, in the case of FIG. 9) tangential to the voltage limiting oval. The d-axis current yielding the limit torque is represented by the d-axis coordinate (X, in the case of FIG. 9) of the tangent point.

Hereinafter, a computation rule of the d-axis current command to provide the limit torque will be described. First, the voltage limiting oval is formulated. Equation-3 is the voltage equation of the IPMSM. In Equation-3, vd and vq are the d-axis and q-axis voltages, respectively, R is the winding resistance of the motor, ω is the rotating speed of the motor, and p is the differential operator.

$$\begin{bmatrix} vd \\ vq \end{bmatrix} = \begin{bmatrix} R + p \cdot Ld & -\omega \cdot Lq \\ \omega \cdot Ld & R + p \cdot Lq \end{bmatrix} \begin{bmatrix} id \\ iq \end{bmatrix} + \begin{bmatrix} 0 \\ \omega \cdot \psi_0 \end{bmatrix} \quad \text{[Equation-3]}$$

In this description, a stationary state is supposed. Moreover, there are neglected a voltage drop caused by winding resistance R of the motor, and voltage drops across inductances Ld and Lq caused by current variations. Then, the degree of voltage will be discussed through the use of an induced voltage. The condition for the induced voltage not to cause the voltage saturation is represented by Equation-4, where Vc is the suppliable voltage of motor driving unit 102 and Vb is the induced voltage.

$$Vb = \omega \sqrt{(Ld \cdot id + \psi_0)^2 + (Lq \cdot iq)^2} \le Vc \quad \text{[Equation-4]}$$

Then, letting Vb=Vc and rearranging it gives Equation-5. This is the equation of the voltage limiting oval when the induced voltage is equal to suppliable voltage Vc of motor driving unit 102. This oval has the center point at id=$-\Psi_0$/Ld, iq=0.

$$(Ld \cdot id + \psi_0)^2 + (Lq \cdot iq)^2 = \left(\frac{Vc}{\omega}\right)^2 \quad \text{[Equation-5]}$$

Next, Equation-6 representing torque τ is yielded by eliminating q-axis current iq from both Equation-1 representing the torque curve and Equation-5 representing the voltage limiting oval yields.

$$\tau = P\{\psi_0 + (Ld - Lq) \cdot id\}\sqrt{\left(\frac{Vc}{\omega}\right)^2 - (Ld \cdot id + \psi_0)^2} \quad \text{[Equation-6]}$$

Equation-6 is treated as a function of id and Vc/ω.

$$\tau = f\left(id, \frac{Vc}{\omega}\right) \quad \text{[Equation-7]}$$

Here, id satisfying Equation-8, the condition of the tangent point, represents the d-axis current that provides the maximum torque at a certain value of Vc/ω.

$$\frac{\partial}{\partial i_d}\tau = \frac{\partial}{\partial i_d} f\left(id, \frac{Vc}{\omega}\right) = 0 \quad \text{[Equation-8]}$$

Figure 10:
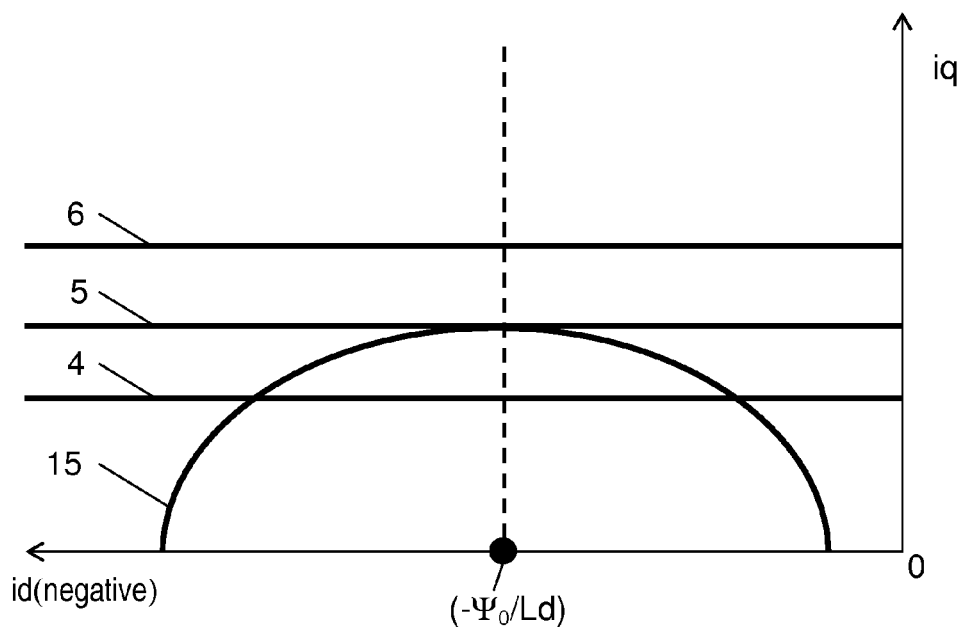
FIG. 10 is a view of a current vector locus in a surface permanent magnet type synchronous motor.

When the motor is a surface permanent magnet type synchronous motor (referred sometimes to as a "SPMSM," hereinafter), the d-axis current providing the maximum torque can be easily determined, compared to that for the IPMSM. FIG. 10 shows a schematic view of a current vector locus in the SPMSM. As shown in FIG. 10, constant torque curves 4, 5, and 6 of the SPMSM are straight lines parallel to the d-axis. Accordingly, it follows that the tangent point between voltage limiting oval 15 and constant torque curve 5 always has the same d-axis coordinate as that of the center point of the oval, which thereby determines the d-axis current providing the maximum torque to be a constant of $-\Psi_0$/Ld. In the IPMSM as well, because the motor having a low degree of saliency has characteristics similar to those of the SPMSM, negative upper limit $id_{lmt}$ of the d-axis current command may simply be set to the constant of $-\Psi_0$/Ld described above.

Thus, the computation rule of the d-axis current command providing the limit torque has been described.

D-axis current command limiter 109 restricts the d-axis current command between zero and negative upper limit $id_{lmt}$ described above. Then, difference $\Delta id_{lmt}^*$ obtained by subtracting post-restriction output id* from pre-restriction input $id_o^*$ is output to target command limiter 110. This Difference $\Delta id_{lmt}^*$ represents the excess amount of d-axis current command id* that is generated excessively over negative upper limit $id_{lmt}$.

Target command limiter 110 restricts torque command $\tau_0^*$ in accordance with a value based on excess amount $\Delta id_{lmt}^*$ of the d-axis current command. The method of the restriction is not limited to a specific one. For example, the limit value may be set equal to the value obtained by subtracting a value in proportion to excess amount $\Delta id_{lmt}^*$ of the d-axis current command from the maximum value of predetermined torque command $\tau_0^*$. With this configuration, the limit value is automatically adjusted in accordance with the degree of the voltage saturation. Moreover, the limit value is set to a value to which the absolute value of torque command $\tau_0^*$ is limited, which allows the torque to be maintained at the outputtable limit even when the torque command inputted from the outside is either a positive value or a negative value (regeneration torque command).

Hereinafter, descriptions will be made regarding functions of the method for controlling the thus-configured motor, and functions of the control device of the motor.

A restriction operation on the torque command during power running is described using the current vector locus of FIG. 9.

In the case where torque command $\tau_0^*$ from the outside is indicated by constant torque curve 1, the magnetic-flux weakening control causes both the current command vector and the actual operating point to converge into intersection point A between voltage limiting oval 15 and constant torque curve 1. During the convergence, the restriction operation on the torque command is not performed because difference $\Delta id_{lmt}^*$ inputted to target command limiter 110 is equal to zero.

In the case where torque command $\tau_0^*$ from the outside is indicated by constant torque curve 3, the voltage saturation cannot be eliminated only by the magnetic-flux weakening control because of the absence of the intersection point of the curve with voltage limiting oval 15. Hence, the restriction operation on torque command $\tau_0^*$ is performed as follows.

First, through the magnetic-flux weakening control, the current command vector moves along constant torque curve 3 in the negative direction of the d-axis. After the current command vector has reached point B where d-axis current command id* is equal to negative upper limit X, difference $\Delta id_{lmt}^*$ inputted to target command limiter 110 becomes a positive value, which results in the restriction on the torque command. During the restriction on the torque command, the current command vector moves toward point C on voltage limiting oval 15, with d-axis current command id* being maintained at negative upper limit X (that is, the vector moves on the dashed line). When the current command vector reaches point C, the voltage saturation is eliminated and both the current command and the actual operating point converge into point C.

Up to this point, the description has been made regarding the operation in running operation. On the other hand, when the torque command is set to a negative value, the operation turns into a regeneration operation (braking operation) in which a brake is applied on the motor by using a negative q-axis current. When the voltage saturation occurs in the regeneration operation, the negative q-axis current is increased to be larger than a proper value. This requires the need for restricting the increase in the braking and the current, by performing the magnetic-flux weakening control to suppress the induced voltage of the motor. However, in the regeneration operation as well, the restriction on the torque command is necessary in a critical region where the torque command from the outside exceeds the outputtable limit of the motor, as is the case in the running operation.

Figure 11:
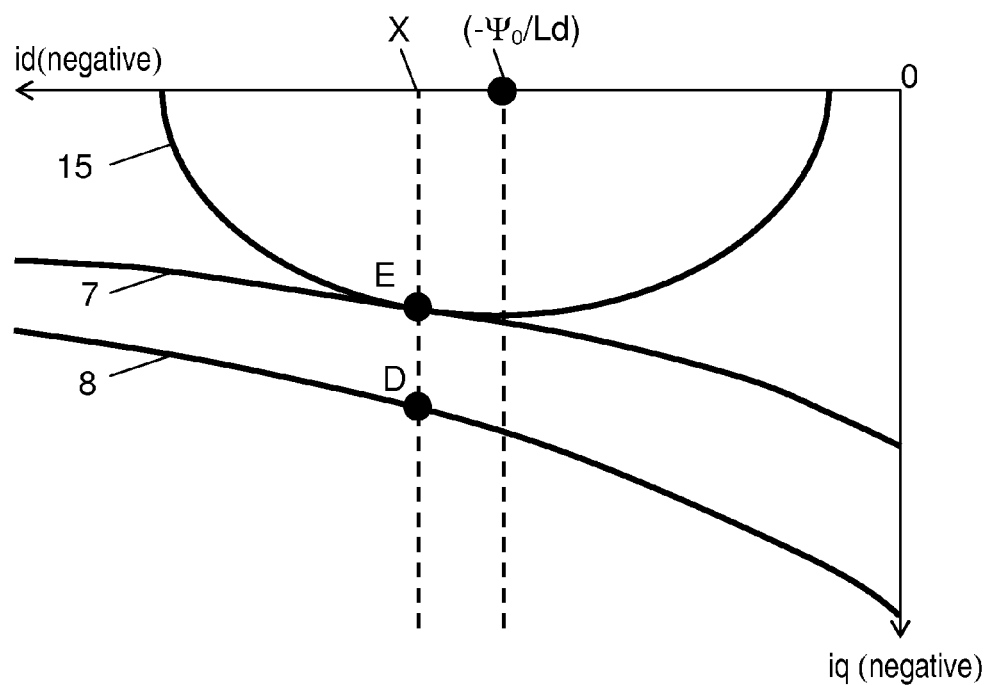
FIG. 11 is a view of a current vector locus in the interior permanent magnet type synchronous motor in regeneration operation.

The restriction operation on the torque command in the regeneration operation will be described using the current vector locus shown in FIG. 11. As shown in FIG. 11, the q-axis current command is a negative value in the regeneration operation. Here, when torque command $\tau_0^*$ from the outside is indicated by constant torque curve 8, the voltage saturation cannot be eliminated only by the magnetic-flux weakening control because of the absence of the intersection point of the curve with voltage limiting oval 15. Consequently, as is the case in the running operation, the torque command is restricted to constant torque curve 7 that shares tangent point E with voltage limiting oval 15, through operation of the loop from magnetic-flux weakening current command generator 105 to target command limiter 110.

As described above, in the embodiment, there are disposed magnetic-flux weakening current command generator 105 and target command limiter 110. This allows the target command value to be automatically and correctly maintained at the outputtable limit of the motor when torque command $\tau_0{}^*$ exceeding the outputtable limit is imputted, even in the presence of variations and/or motor-to-motor unevenness in motor constants. This configuration allows the highly-stable and high-output driving of the motor. Here, magnetic-flux weakening current command generator 105 generates magnetic-flux weakening current command ids*, based on difference $\Delta v^*$ between first predetermined reference value $V_{lmt}$ and absolute value |v*| of the voltage command from current vector controller 103 to motor driving unit 102. Moreover, target command limiter 110 sets the limit value of torque command $\tau_0{}^*$ from the outside, based on difference $\Delta id_{lmt}{}^*$ that is the value by which d-axis current command $id_0{}^*$ exceeds negative upper limit $id_{lmt}$. In this way, in the regeneration operation, the target command value is properly restricted in the similar manner, which can prevent the occurrence of an overcurrent, an overvoltage, and an excessive braking torque caused by excessive flowing of the q-axis current, allowing a highly-stable and highly-efficient regeneration operation in up to the critical region.

Figure 2:
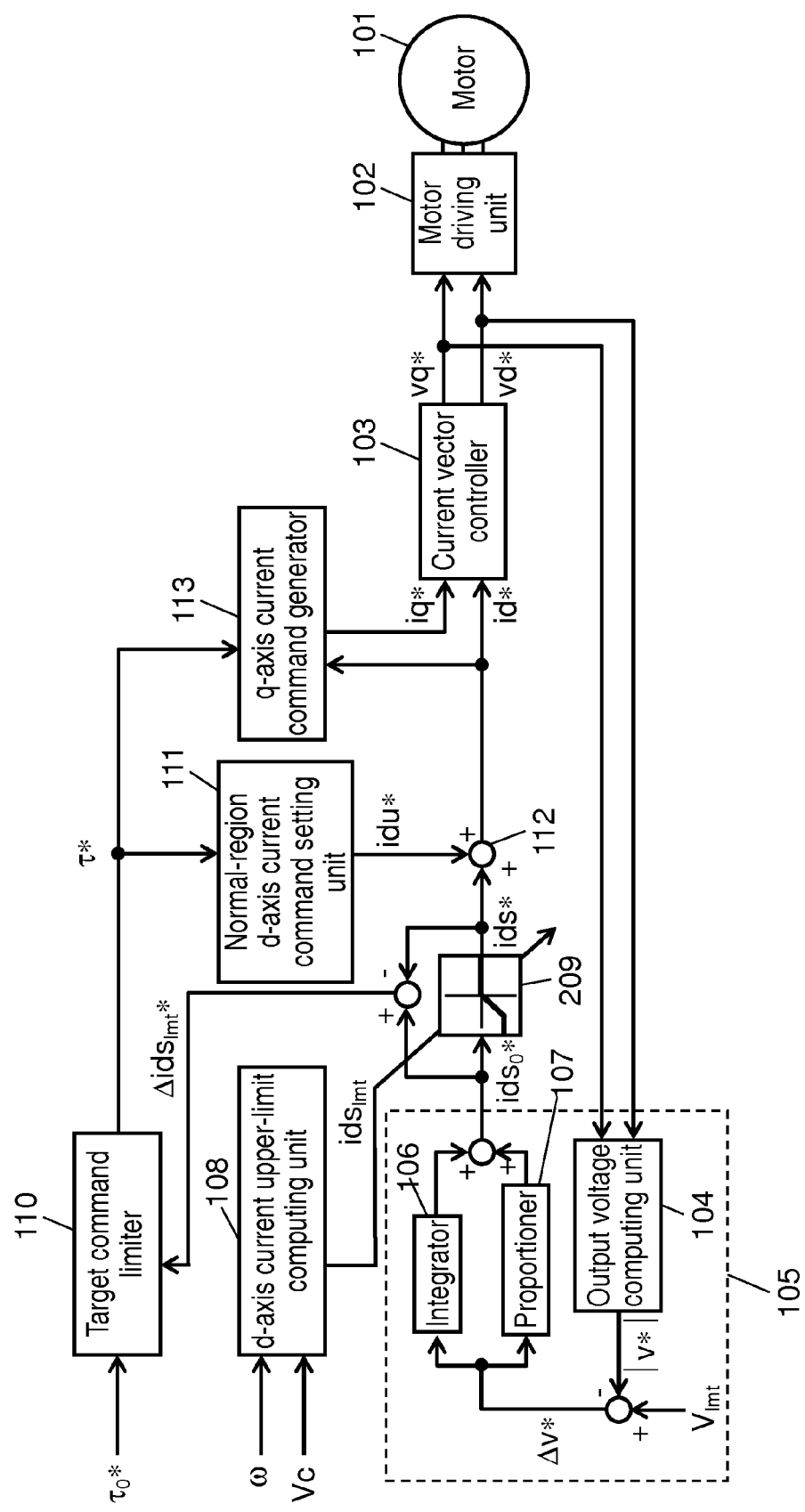
FIG. 2 is a block diagram of an example of modifications of the motor control device according to the first embodiment of the invention.

FIG. 2 is a block diagram of an example of modifications of the motor control device according to the first embodiment of the present invention. In FIG. 2, the arrangements are interchanged between d-axis current command limiter 109 and d-axis current command adder 112. In addition, instead of d-axis current command limiter 109, there is disposed magnetic-flux weakening current command limiter 209 that restricts the magnetic-flux weakening current command. In the embodiment, even with the configuration of the motor control device as shown in FIG. 2, it provides functions and advantages equivalent to those of the configuration in FIG. 1.

With the configuration in FIG. 2, magnetic-flux weakening current command limiter 209 restricts magnetic-flux weakening current command ids* between zero and negative upper limit $ids_{lmt}$ of the magnetic-flux weakening current command. In addition, the limiter outputs value $\Delta ids_{lmt}{}^*$ by which magnetic-flux weakening current command ids* exceeds negative upper limit $ids_{lmt}$, to target command limiter 110. Here, upper limit $ids_{lmt}$ is computed from Equation-9.

$$ids_{lmt}{}^* = id_{lmt}{}^* - idu^*$$ [Equation-9]

Figure 3:
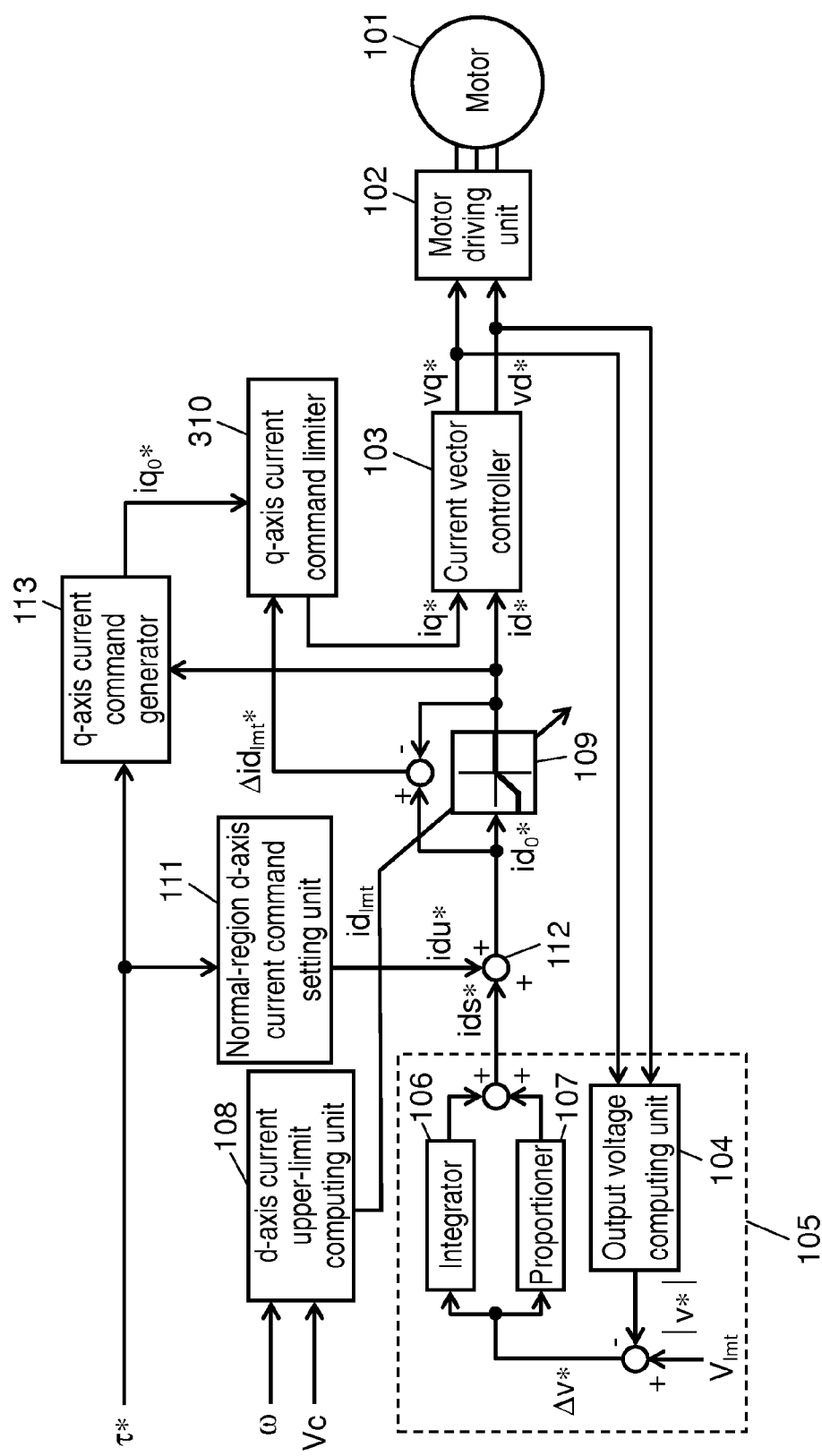
FIG. 3 is a block diagram of another example of the modifications of the motor control device according to the first embodiment of the invention.

FIG. 3 is a block diagram of another example of the modifications of the motor control device according to the first embodiment of the invention. The motor control device shown in FIG. 3 employs, instead of the target command limiter, q-axis current command limiter 310 that restricts q-axis current command iq*. In the embodiment, even with the configuration of the motor control device as shown in FIG. 3, it provides functions and advantages equivalent to those of the configuration in FIG. 1.

Second Exemplary Embodiment

Figure 4:
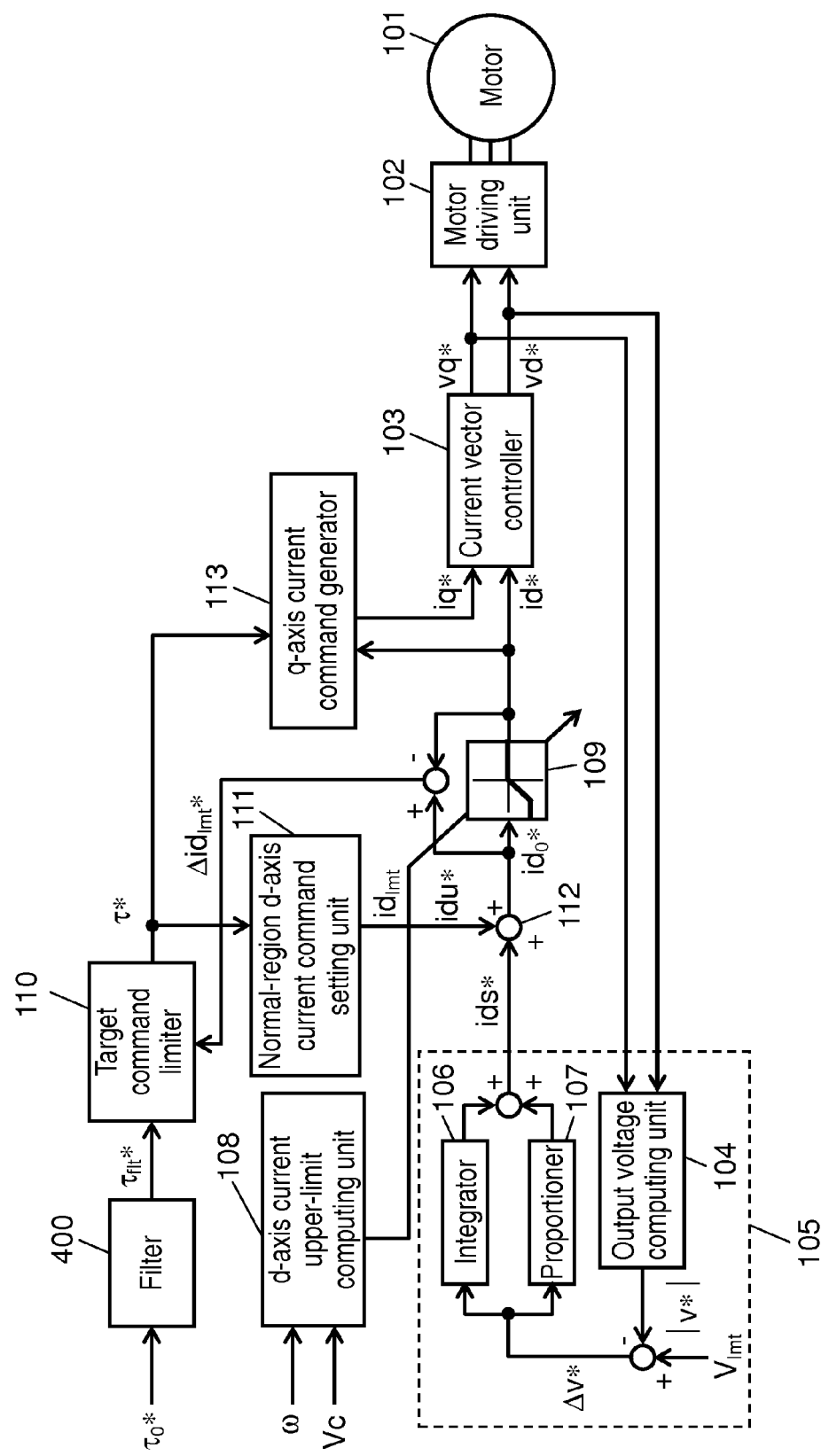
FIG. 4 is a block diagram of a motor control device according to a second embodiment of the invention.

FIG. 4 is a block diagram of a motor control device according to a second embodiment of the present invention. In the embodiment, filter 400 is inserted at a pre-stage of target command limiter 110 of the first embodiment shown in FIG. 1. The other parts of the configuration are the same as those of the first embodiment.

Filter 400 performs smoothing on torque command $\tau_0{}^*$ imputted from the outside. The algorithm for the smoothing is not limited to a specific one; a first-order lag lowpass filter is used, for example. Thus-smoothed torque command $\tau_{flt}{}^*$ is imputted to target command limiter 110.

Functions and advantages of filter 400 will be described.

As described in the first embodiment, when torque command $\tau_0{}^*$ exceeding the outputtable limit of motor 101 is imputted from the outside, target command limiter 110 restricts torque command $\tau_0{}^*$ to eliminate the voltage saturation. However, target command limiter 110 does not start working until d-axis current command $id_0{}^*$ exceeds upper limit $id_{lmt}$. That is, there is a time lag between when the input of torque command $\tau_0{}^*$ is started and when the restriction of the command is started. During the period of the time lag, target command limiter 110 outputs torque command $\tau_0{}^*$ as it is, and a torque control is performed based on thus-output $\tau_0{}^*$.

For this reason, in the first embodiment without filter 400, when torque command $\tau_0{}^*$ varies abruptly, the output torque sometimes overshoots or undershoots.

On the other hand, in the embodiment, filter 400 moderates the variations in torque command $\tau_{flt}{}^*$ in the period of the time lag, which allows the advantage of suppressing the overshoot and undershoot of the output torque.

As described above, in the embodiment, the configuration including filter 400 provides the advantage of suppressing the overshoot and undershoot of the output torque, in addition to the same advantages as those in the first embodiment.

Third Exemplary Embodiment

Figure 5:
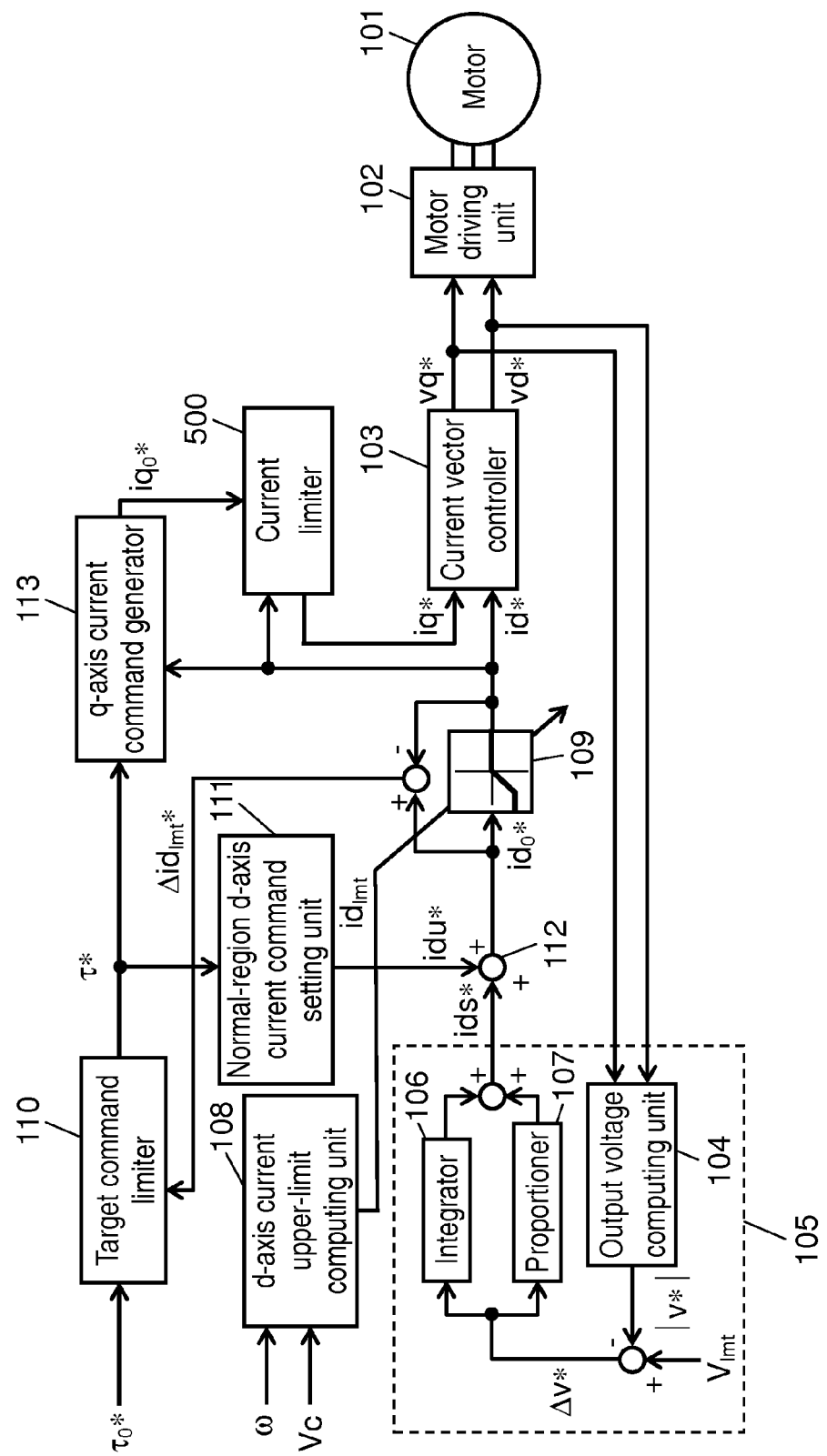
FIG. 5 is a block diagram of a motor control device according to a third embodiment of the invention.

FIG. 5 is a block diagram of a motor control device according to a third embodiment of the present invention. In the embodiment, current limiter 500 is added to the configuration according to the first embodiment shown in FIG. 1. The other parts of the configuration are the same as those in the first embodiment.

The magnetic-flux weakening control eliminates the voltage saturation by passing the negative d-axis current. However, this has drawbacks, that is, heat generation and decreased efficiency both attributed to an increase in the motor current. Current limiter 500 somewhat overcomes these drawbacks.

Current limiter 500 substitutes d-axis current command id* into Equation-10, computes upper limit $Iq_{lmt}$ of the absolute value of the q-axis current command, and thereby restricts, to upper limit $Iq_{lmt}$, the absolute value of q-axis current command $iq_0{}^*$ output from q-axis current command generator 113. That is, q-axis current command iq* is restricted between upper limit $Iq_{lmt}$ and lower limit $-Iq_{lmt}$. The current limiter restricts the absolute value of q-axis current command $iq_0{}^*$; therefore, it can work as a limiter even when the torque command inputted from the outside is either a positive value or a negative value (regeneration torque command). In Equation-10, $I_{max}$ is the maximum magnitude (referred sometimes to as the "maximum current value," hereinafter) of the current vector that is a sum of the d-axis current and the q-axis current.

$$Iq_{lmt} = \sqrt{I_{max}{}^2 - id^{*2}}$$ [Equation-10]

Current limiter 500 works such that the magnitude of the current that is the sum of the d-axis current and the q-axis current is restricted not to exceed maximum current value $I_{max}$. For this reason, it is possible to suppress the influence of heat generation and decreased efficiency both attributed to an excessive increase in the current of motor 101 with increasing d-axis current.

Operations according to the embodiment will be described using the current vector locus in FIG. 12.

Figure 12:
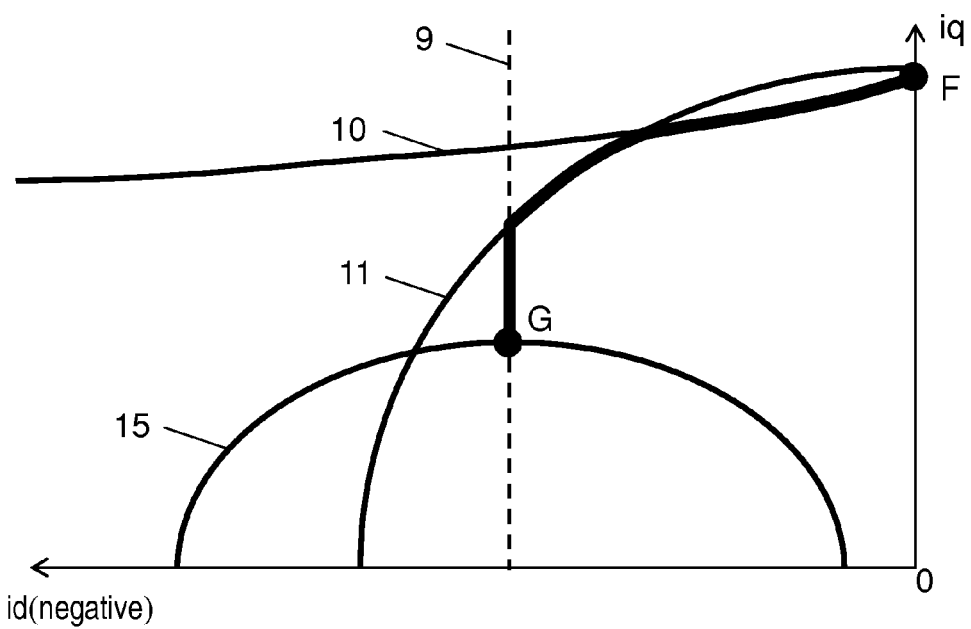
FIG. 12 is a view of a current vector locus in the third embodiment of the invention.

In FIG. 12, d-axis current limit line (dashed line) 9 represents negative upper limit $id_{lmt}$ of the d-axis current command, constant torque curve 10 represents torque command $\tau_0^*$ from the outside, and current limit circle 11 represents the circle having radius $I_{max}$ with the center at the coordinate origin. Here, d-axis current limit line 9 represents negative upper limit $id_{lmt}$ of d-axis current limiter 109 (FIG. 5).

The initial position of the operating point is set at point F. First, through the magnetic-flux weakening control, the operating point moves along constant torque curve 10 in the negative direction of the d-axis. When the operating point reaches the intersection point between constant torque curve 10 and current limit circle 11, current limiter 500 restricts the magnitude of the current command vector to upper limit $Iq_{lmt}$, which thereby causes the operating point to move along current limit circle 11. When the operating point reaches the intersection point between current limit circle 11 and d-axis current limit line 9, the torque command is restricted as is the case in the first embodiment, which thereby causes the operating point to move along d-axis current limit line 9, with d-axis current command id* being maintained at negative upper limit $id_{lmt}$. When the operating point reaches intersection point G between voltage limiting oval 15 and d-axis current limit line 9, the voltage saturation is eliminated and both the current command and the actual operating point converge into point G.

As described above, in the embodiment, the configuration described above includes current limiter 500, which thereby allows the restriction of the magnitude of the current flowing in motor 101 to the predetermined maximum current value. With this configuration, it is possible to obtain the advantage of reducing adverse influences such as heat generation and decreased efficiency both attributed to an excessive increase in the current of motor 101 with increasing d-axis current, in addition to the same advantages as those in the first embodiment.

Fourth Exemplary Embodiment

Figure 6:
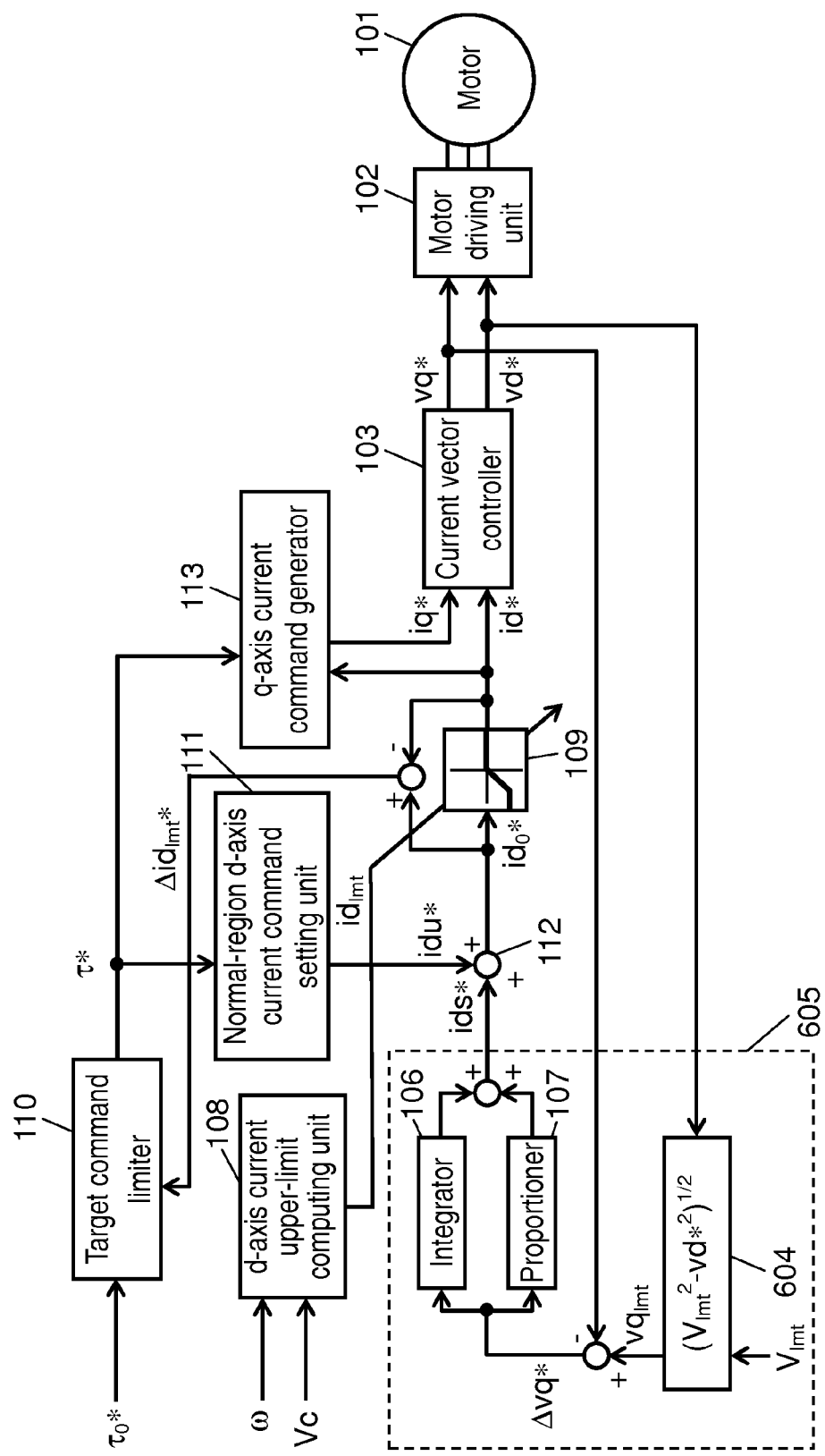
FIG. 6 is a block diagram of a motor control device according to a fourth embodiment of the invention.

FIG. 6 is a block diagram of a motor control device according to a fourth embodiment of the present invention. The configuration of the embodiment is the same as that of the first embodiment shown in FIG. 1, except that magnetic-flux weakening current command generator 105 is modified.

Magnetic-flux weakening current command generator 605 shown in FIG. 6 uses q-axis component vq* of the voltage command, instead of absolute value |v*| of the voltage command in the first embodiment. Moreover, second predetermined reference value $Vq_{lmt}$ is generated by correcting first predetermined reference value $V_{lmt}$ in the first embodiment, using Equation-11 and d-axis component vd* of the voltage command. In this way, magnetic-flux weakening current command generator 605 in the embodiment generates magnetic-flux weakening current command ids*, based on difference Δvq* between second predetermined reference value $Vq_{lmt}$ and q-axis component vq* of the voltage command from current vector controller 103 to motor driving unit 102. The other parts of the configuration are the same as those in the first embodiment.

$$vq_{lmt} = \sqrt{V_{lmt}^2 - vd^{*2}} \quad \text{[Equation-11]}$$

Equation-11 has a feature in that, because the number of the input variables for output variable $vq_{lmt}$ is one (vd*), the processing load in computing the equation can be reduced compared to that for Equation-2 having two input variables. Patent Literature 3 describes the method for performing a magnetic-flux weakening control in which magnetic-flux weakening current command generator 605 is configured as described above. Even with such the configuration, however, it is possible to obtain the same functions and advantages as those of the first embodiment.

Fifth Exemplary Embodiment

Figure 7:
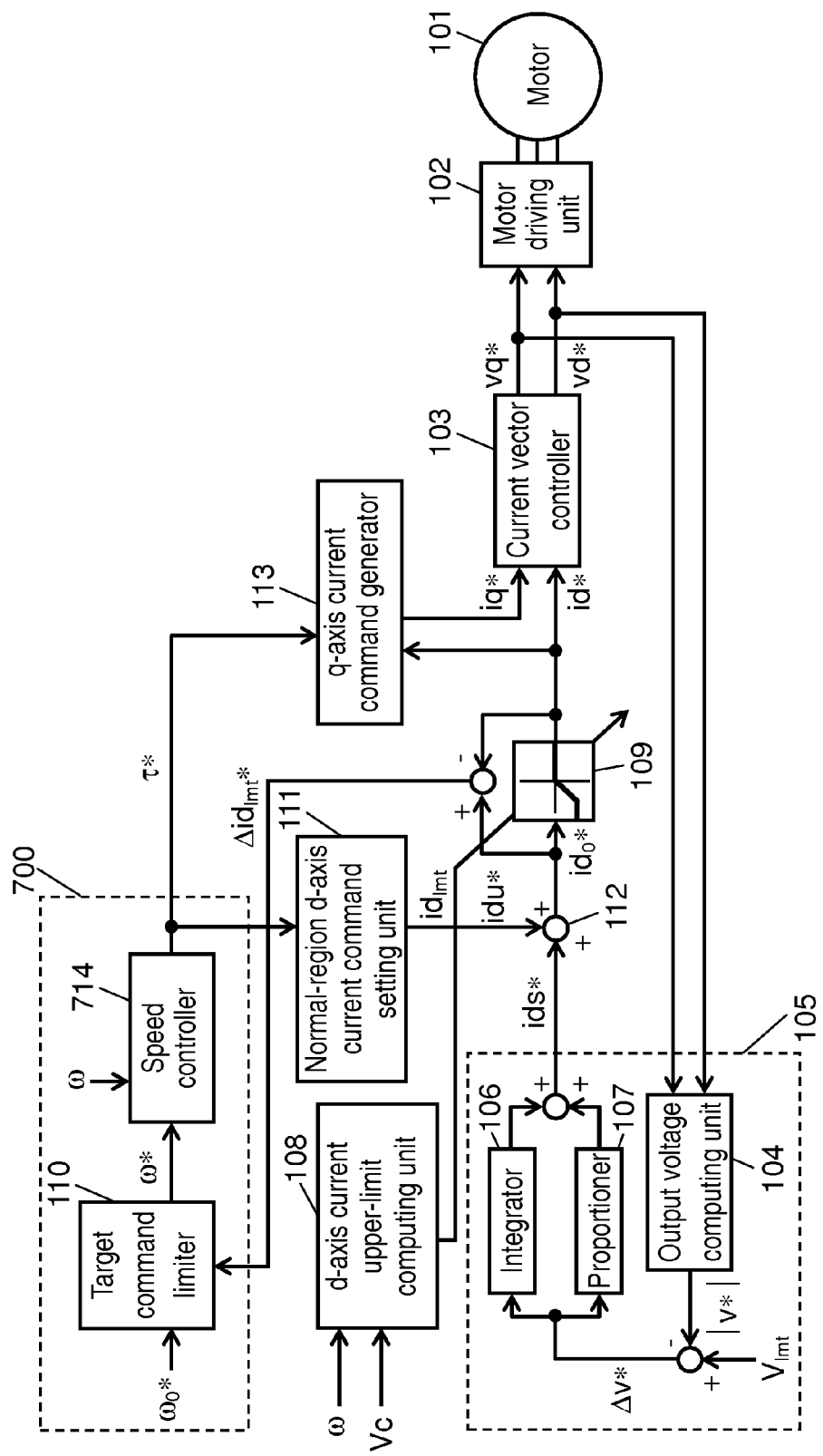
FIG. 7 is a block diagram of a motor control device according to a fifth embodiment of the invention.

FIG. 7 is a block diagram of a motor control device according to a fifth embodiment of the present invention. The configuration of the embodiment is such that speed controller 714 is added to the configuration of the first embodiment shown in FIG. 1, and the motor is driven under a speed control in accordance with a speed command imputted from the outside. The configuration is the same as that of the first embodiment, except for speed control system 700.

Target command limiter 110 restricts speed command $\omega_o^*$ from the outside to the outputtable limit of motor 101, and outputs thus-restricted speed command ω* to speed controller 714.

Speed controller 714 generates torque command τ* by a PI control, for example, such that the error between inputted speed command ω* and rotating speed ω of motor 101 becomes equal to zero. Thus-generated torque command τ* is output to normal-region d-axis current command setting unit 111 and q-axis current command generator 113.

The other parts of the processing are the same as those for the torque control described in the first embodiment.

In the embodiment, if the configuration is employed in which, instead of the speed command, either the torque command output from speed controller 714 or the q-axis current command is restricted, the operation becomes deteriorated and/or unstable due to the following reasons.

Figure 8A:
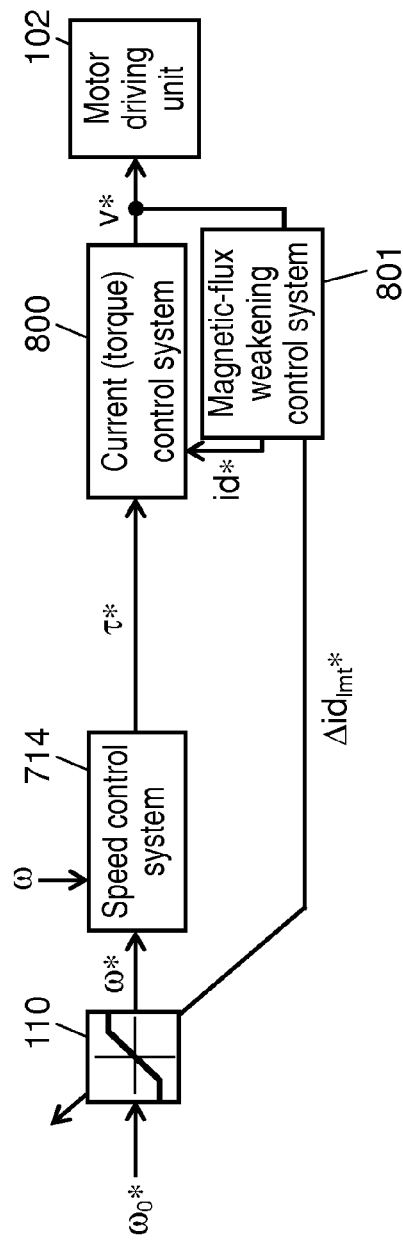
FIG. 8A is a simplified block diagram of the fifth embodiment of the invention.
Figure 8B:
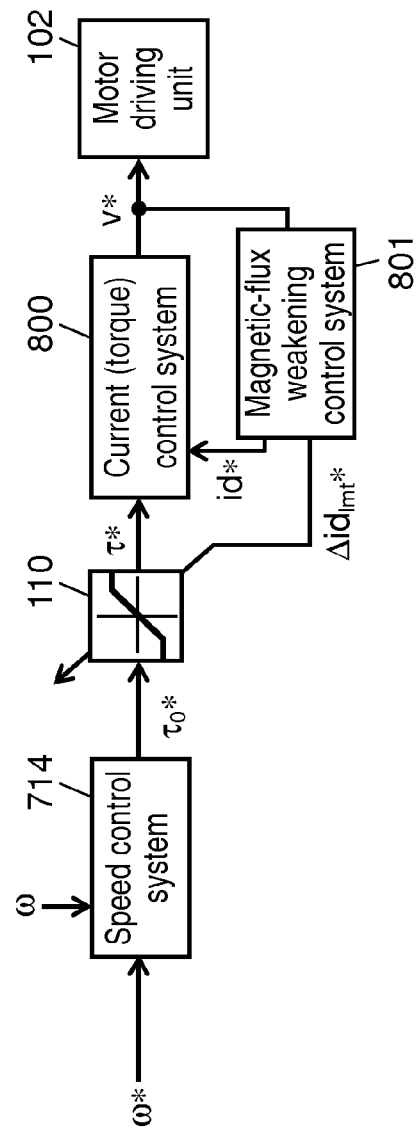
FIG. 8B is a simplified block diagram of a modification of the fifth embodiment of the invention.
Figure 13:
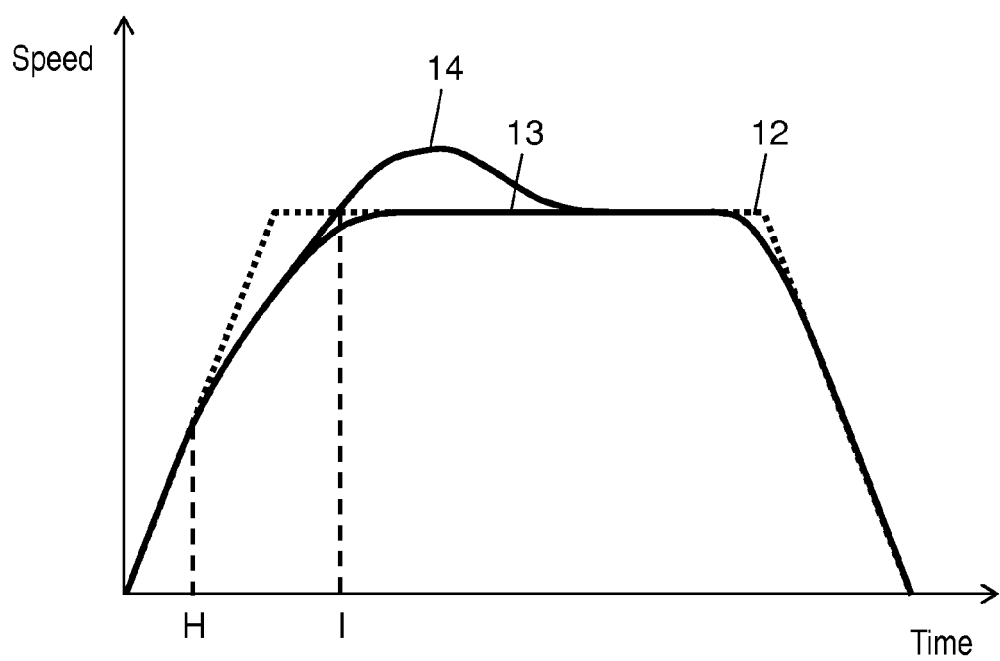
FIG. 13 is a view of speed loci in the fifth embodiment of the invention.
Figure 14:
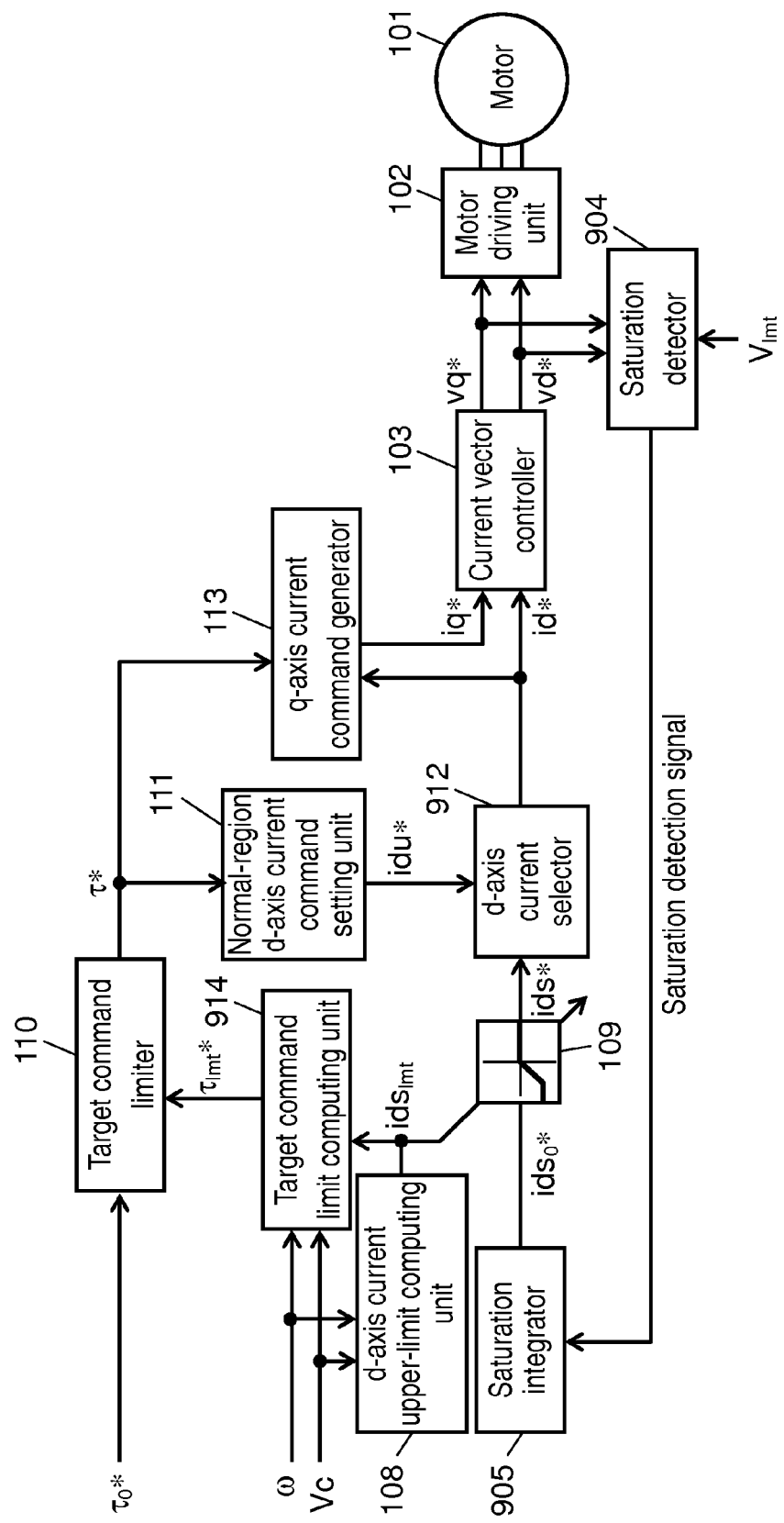
FIG. 14 is a block diagram of a motor control device according to a conventional art.

For a simplified description, FIG. 8A shows a block diagram simplified from that of FIG. 7. FIG. 8B shows a block diagram of the configuration in which the torque command is restricted instead of the speed command. Moreover, FIG. 13 shows speed loci in the cases where the configurations of FIG. 8A and FIG. 8B are employed. In FIG. 13, speed command waveform 12 indicated by the dotted line represents the speed command waveform from the outside, speed waveform 13 represents the speed waveform when the configuration of FIG. 8A is employed, and speed waveform 14 represents the speed waveform when the configuration of FIG. 8B is employed.

In FIG. 13, suppose that the voltage saturation occurs during an acceleration operation that needs torque, and the output reaches the outputtable limit at time H. Both speed waveforms 13 and 14 show that speed follow-up errors occur due to the restriction on the command, after the output has reached the outputtable limit. Speed waveform 13 shows a smooth convergence into the speed command. In contrast, however, speed waveform 14 shows that the torque does not converge even after time I when the speed reached the speed command, which causes an overshoot in the speed. This is because the speed follow-up errors during the restriction of torque command $\tau_o^*$ are integrated in an integral term of speed controller 714. In this way, when the command signal is restricted in the inside of the control loop including the integrator, the wind-up of the integral term occurs, resulting in deteriorated responsibility and/or unstable operation.

Consequently, the restriction operation in the present invention is preferably performed on the command signal in the outside of the outermost circumferential control loop, as the configurations in FIGS. 7 and 8A.

With the configuration described above, even in the presence of variations and/or motor-to-motor unevenness in motor constants, when the command exceeds the outputtable limit of the motor, speed command $\omega_o^*$ from the outside is automatically and correctly restricted to the outputtable limit, which allows a highly-stable and high-power driving of the motor.

As described above, the motor control device according to the present invention includes the motor driving unit for driving the motor, the current vector controller, the magnetic-flux weakening current command generator, and one of the target command limiter and the q-axis current command limiter. The current vector controller controls the electric current of the motor by separating the current into the d-axis current and the q-axis current orthogonal to each other, in accordance with the target command value from the outside. The magnetic-flux weakening current command generator generates the d-axis current command for controlling the amount of the d-axis current, based on one of the differences: That is, the difference between the first predetermined reference value and the absolute value of the voltage command from the current vector controller to the motor driving unit, and the difference between the second predetermined reference value and the q-axis component of the voltage command. The target command limiter sets the limit value of the target command value from the outside, based on the value by which the d-axis current command exceeds the negative upper limit. The q-axis current command limiter sets the limit value of the q-axis current command for controlling the amount of the q-axis current.

With this configuration, in the case where the voltage command exceeds the predetermined reference value, the negative d-axis current command is increased; in the case where the voltage command still exceeds the predetermined reference value even after the d-axis current command has reached the negative upper limit, either the target command value from the outside or the q-axis current command is restricted until the excess amount of the voltage command converges to zero. Alternatively, in the case where the q-axis component of the voltage command exceeds the predetermined reference value, the negative d-axis current command is increased; in the case where the q-axis component of the voltage command still exceeds the predetermined reference value even after the d-axis current command has reached the negative upper limit, either the target command value from the outside or the q-axis current command is restricted until the excess amount of the voltage command converges to zero.

Consequently, even in the presence of variations and/or motor-to-motor unevenness in motor constants, when the target command value exceeding the outputtable limit of the motor is imputted, either the target command value or the q-axis current command is automatically and correctly maintained at the outputtable limit, which allows the highly-stable and high-output driving of the motor. Moreover, in the regeneration operation as well, the target command value is properly restricted in the similar manner, which can prevent the occurrence of an overcurrent, an overvoltage, and an excessive braking torque caused by excessive flowing of the q-axis current, allowing the highly-stable and highly-efficient regeneration operation in up to the critical region.

Moreover, in the motor control device according to the present invention, the filter for performing smoothing on either the target command value from the outside or the q-axis current command is disposed at the pre-stage of either the limiter for setting the limit value of the target command value from the outside or the limiter for setting the limit value of the q-axis current command. With this configuration, it is possible to suppress the overshoot and undershoot of the output torque.

Furthermore, in the motor control device according to the present invention, the current limiter is disposed for restricting the magnitude of the q-axis current command in accordance with the magnitude of the d-axis current command such that the magnitude of the current command vector, i.e. the sum of the d-axis current command and the q-axis current command, of the motor does not exceed the predetermined maximum current value. With this configuration, it is possible to restrict the magnitude of the current flowing in the motor to the predetermined maximum current value.

In addition, in the motor control device according to the present invention, the second predetermined reference value of the magnetic-flux weakening current command generator is obtained by correcting the first predetermined reference value by using the d-axis component of the voltage command to the motor driving unit.

Moreover, in the motor control device according to the present invention, the negative upper limit of the d-axis current command is set equal to zero. With this configuration, even when the magnetic-flux weakening control is not used, and even in the presence of variations and/or motor-to-motor unevenness in motor constants, the operation of the proper restriction on either the target command value from the outside or the q-axis current command can ensure the stable power-running driving and/or the stable regeneration operation in the voltage saturation region.

INDUSTRIAL APPLICABILITY

As described above, in the motor control device according to the present invention, even in the presence of variations and/or motor-to-motor unevenness in motor constants, when the target command value exceeding the outputtable limit of the motor is imputted, either the target command value or the q-axis current command can be automatically and correctly maintained at the outputtable limit, which allows the highly-stable and high-output driving of the motor. Accordingly, the motor control device is applicable to uses where motors are driven in the voltage saturation region, such as automotive motor applications where capacities of motor itself and butteries are restricted, and motor applications for a variety of actuators and machine tools where a large amount of torque is required instantaneously or intermittently.

The invention claimed is:

1. A motor control device comprising:
a motor driving unit for driving a motor;
a current vector controller for controlling a current of the motor by separating the current into a d-axis current and a q-axis current orthogonal to each other in accordance with a target command value from an outside;
a magnetic-flux weakening current command generator for generating a d-axis current command controlling an amount of the d-axis current based on one of a difference between a first predetermined reference value and an absolute value of a voltage command from the current vector controller to the motor driving unit and a difference between a second predetermined reference value and a q-axis component of the voltage command; and
one of a target command limiter and a q-axis current command limiter, the target command limiter for setting a limit value of the target command value from the outside based on a value by which the d-axis current command exceeds a negative upper limit, and the q-axis current command limiter for setting a limit value of a q-axis current command controlling an amount of the q-axis current.

2. The motor control device according to claim 1, further comprising a filter for smoothing one of the target command value from the outside and the q-axis current command.

3. The motor control device according to claim 1, further comprising a current limiter for restricting a magnitude of the q-axis current command in accordance with a magnitude of the d-axis current command such that a magnitude of a current command vector of the motor does not exceed a predetermined value, the current command vector being a sum of the d-axis current command and the q-axis current command.

4. The motor control device according to claim 1, wherein the second predetermined reference value of the magnetic-flux weakening current command generator is obtained by correcting the first predetermined reference value by using a d-axis component of the voltage command to the motor driving unit.

5. The motor control device according to claim 1, wherein an upper limit of the d-axis current command is set to zero.

* * * * *